United States Patent [19]

Adachi

[11] Patent Number: 5,636,336
[45] Date of Patent: Jun. 3, 1997

[54] GRAPHICS PROCESSING UNIT FOR USE WITH A STYLUS PEN AND TABLET, AND METHOD THEREFORE

[75] Inventor: Motomitsu Adachi, Kawasaki, Japan

[73] Assignee: Fujitsu Limited, Kawasaki, Japan

[21] Appl. No.: 695,876

[22] Filed: Aug. 12, 1996

Related U.S. Application Data

[63] Continuation of Ser. No. 133,865, Oct. 12, 1993, abandoned.

[30] Foreign Application Priority Data

Oct. 19, 1993 [JP] Japan ................... 4-280124

[51] Int. Cl.$^6$ ............... G06F 15/00; G06F 13/00
[52] U.S. Cl. ............. 395/133; 395/128; 395/173; 395/326; 345/122; 345/127
[58] Field of Search ................. 345/121, 122, 345/126, 127, 131, 179; 395/128, 133, 139, 326, 339, 173, 501, 523

[56] References Cited

U.S. PATENT DOCUMENTS

| | | | |
|---|---|---|---|
| 5,194,852 | 3/1993 | Mori et al. | 345/182 |
| 5,235,679 | 8/1993 | Yoshizawa et al. | 395/336 |
| 5,300,927 | 4/1994 | Arai et al. | 395/157 |
| 5,341,293 | 8/1994 | Vertelney | 395/792 |
| 5,347,295 | 9/1994 | Agulnick | 345/156 |

FOREIGN PATENT DOCUMENTS

S61-196289 8/1986 Japan.
S62-197871 9/1987 Japan.

OTHER PUBLICATIONS

Microsoft Windows Print Manager Version 3.1 ©1985–1992 Microsoft Corp.—Screen Dumps 4 and 5.

P.V. Rangan et al. "A Window–Based Editor for Digital Video & Audio." System Sciences, 1992 Annual Hawaii Int'l, pp. 640–648 1991.

"Features & a Model for Icon Morphological Transformation" Visual Languages, 1991 IEEE Workshop. pp. 240–245 1991.

"Construction & Manipulation of Dynamic Icons" Visual Language 1988 IEEE Workshop pp. 78–83 1988.

Screen Dumps 1–3 of WordPerfect for Windows Version 5.1 ©WordPerfect Corporation, 1991.

*Primary Examiner*—Kee M. Tung
*Assistant Examiner*—M. Chauhan
*Attorney, Agent, or Firm*—Armstrong, Westerman, Hattori, McLeland & Naughton

[57] ABSTRACT

An instruction for transformation processing of an image is detected. An instruction for specifying a targeted image which will be the object of transformation processing is detected. An instruction for specifying a fixed point of the image without changing the position thereof, independent of transformation processing, is detected. Then, the instructed transformation processing is executed on the targeted image. The targeted image is displayed such that the fixed points of the targeted image before/after image processing are matched.

9 Claims, 8 Drawing Sheets

GRAPHICS PROCESSING UNIT FOR USE WITH A STYLUS PEN AND TABLET, AND METHOD THEREFORE

This application is a continuation of application Ser. No. 08/133,865, filed Oct. 12, 1993, now abandoned.

BACKGROUND OF THE INVENTION

1. Field of the Invention

The present invention relates to a graphics processing unit, for example, a terminal including a human interface giving an instruction with a tablet and a stylus pen forming an I/O-integrated operation section, and to a method of graphics processing.

2. Description of the Related Art

The number of terminals having an I/O-integrated tablet is small. Such a terminal is often operated by using a mouse.

FIG. 1 shows a method of graphics processing in which a tablet is replaced by a mouse.

As shown in FIG. 1, in this example, a temporary holding area for graphic editing is secured by a mouse in the step S1. That is, this operation is executed by selecting a clip board command.

In the step S2, a mouse cursor is shifted so as to select the targeted graphic item.

In the step S3, a processing item (copy command) is selected by clicking a command icon (picture character) with a mouse button.

In the step S4, the targeted graphic item is copied to the temporary holding area and the page where the graphic item is to be transferred is specified. Then, the targeted graphic item is copied from the temporary holding area and is pasted on the place where it is to be transferred.

As described above, conventionally, a method of transferring a graphic item is generally employed as follows. A graphic item is transferred together with a mouse cursor while clicking a mouse in an operation referred to as dragging.

Although the operation of transferring a graphic item cannot be achieved in most terminals having an I/O-integrated tablet, some terminals can realize such an operation by using a mouse. Particularly, transferring, copying and pasting a graphic item can be achieved by using the mouse dragging operation as if a pen touches the graphic item.

Whether a mouse or a stylus pen is used, when a graphic item is transferred, for example, it is necessary to have a process for ensuring a temporarily escaping area on the screen. Thus, the handling is not always simple and might not be executed for a short time.

SUMMARY OF THE INVENTION

According to the present invention, when a user operates a terminal, particularly when he/she executes a transferring, copying and pasting operation of a graphic item with a stylus pen, an image processing is executed such that when the tip of the pen touches the targeted graphic item, the graphic item is sucked into the tip of the pen, thereby giving a user an illusion that the graphic item enters into the pen. Consequently, transformation processing such as transferring, copying, pasting a graphic item can be simplified and made easy to handle, thus improving a user-friendly human-machine interface.

In order to achieve the above object, according to a first aspect of the present invention, there is provided a graphics processing unit comprising: display means for displaying an image on a screen; an operation section executing an operation, such as giving an instruction to the display for a display process; an instruction detecting section detecting an instruction given by the operation section for transformation processing of the image, or for specifying the targeted image which will be the object of the transformation processing; a targeted image specification processing section; when the instruction detecting section detects the instruction for the transformation processing and the instruction for specifying the targeted image, the targeted image specification processing section executing a process such as sending the targeted image to an image processing section; a fixed-point specification processing section; when the instruction detecting section detects the instruction for the transformation processing and an instruction for specifying a fixed point without changing the position thereof, independent of the transformation processing, the fixed-point specification processing section instructing the display means to display the targeted image such that the fixed points of the targeted image before/after transformation processing are matched to each other; and an image processing section executing the instructed transformation processing on the specified targeted image.

According to a second aspect of the present invention, there is provided a method of graphics processing comprising the steps of: detecting an instruction for transformation processing of an image; detecting an instruction for specifying a targeted image which will be the object of the transformation processing and detecting an instruction for specifying a fixed point without changing the position thereof, independent of the transformation process of the targeted image; and executing the transformation processing on the detected targeted image and displaying the targeted image such that the fixed points of the targeted image before/after transformation processing are matched to each other.

According to a third aspect of the present invention, there is provided a graphics processing unit comprising: display means for displaying an image on a screen; an operation section executing an operation, such as giving an instruction to the screen for a display process; an instruction detecting section detecting an instruction given by the operation section for transformation processing of the image, or for specifying the targeted image which will be the object of the transformation processing, or for various operations, such as a process of specifying a fixed point; a targeted image specification processing section sending the targeted image to an image processing section when the instruction detecting section detects the instruction for the transformation processing and the instruction for specifying the targeted image; an image processing section executing the instructed transformation processing on the specified targeted image; and a high-speed display instruction section; when the instruction detecting section detects the instruction for the transformation processing and detects the process-executing time when the transformation-processed image should be displayed, the high-speed display instruction section instructing the display means to display the transformation-processed targeted image at high speed.

According to a fourth aspect of the present invention, there is provided a method of graphics processing comprising the steps of: detecting an instruction for transformation processing of an image; detecting an instruction for specifying a targeted image which will be the object of the transformation processing; detecting the process-executing time when the transformation-processed image should be displayed; and displaying the targeted image at high speed after the detected targeted image is transformation-processed.

According to a fifth aspect of the present invention, there is provided a graphics processing unit comprising: display means for displaying an image on a screen; an I/O-integrated operation section giving an instruction to the screen for a display process by using a tablet arranged on the screen and a stylus pen, or the like; an instruction detecting section detecting various operational instructions given by the operation section for transformation processing of the image, and for specifying the targeted image which will be the object of the transformation processing; a targeted image specification processing section sending the targeted image to an image processing section when the instruction detecting section detects the instruction for the transformation processing and the instruction for specifying the targeted image; a fixed-point specification processing section; when the instruction detecting section detects the instruction for the transformation processing and an instruction for specifying a fixed point without changing the position thereof, independent of the transformation processing, the fixed-point specification processing section instructing the display means to display the targeted image such that the fixed points of the targeted image before/after transformation processing are matched to each other; an image processing section executing the instructed transformation processing on the specified targeted image; and a level variable specification processing section; when the instruction detecting section detects a level variable indicating the region to be transformed, the transformation speed, the density of display, the color of display, or the like, the level variable specification processing section processing the specification to the display means and the image processing section such that the image is displayed or transformation-processed according to the detected level variable.

According to a sixth aspect of the present invention, there is provided a method of graphics processing comprising the steps of: detecting an instruction for transformation processing of an image given by an I/O-integrated operation section; detecting an instruction for specifying a targeted image which will be the object of the transformation processing and which is set by the I/O-integrated operation section, and detecting an instruction for specifying a fixed point without changing the position thereof, independent of the transformation processing, and detecting a level variable indicating the region to be transformed, the transformation speed, the density of display, the color of display, or the like, set by the I/O-integrated operation section; and executing the transformation processing on the targeted image according to the detected level variable, and subsequently, matching the fixed points of the targeted image before/after transformation processing and displaying the targeted image having the level variable.

In the first and second aspects of the present invention, the instruction for transforming an image given by the operation section is detected by the instruction detecting section.

"[T]he image" includes not only a graphic item but also a character, and the like. "[T]he operation section" includes not only an I/O-integrated operation section with a stylus pen, but also a mouse. "[T]he image transformation" is designated as changing the size and the configuration of the image, for example, enlargement, shrink, deformation, rotation, reverse rotation, appearance, and erasure of the image. Although the position of the image is changed as a result of copying or transferring the image, it is still possible to shrink and erase into a fixed point and to appear and enlarge from another fixed point which is set in a different position from the first fixed point.

The instruction detecting section detects the instruction for specifying the targeted image which will be the object of transformation processing and the instruction for specifying the fixed point. The targeted image specification processing section detects the targeted image specified by the operation section. The fixed-point specification processing section detects the fixed point set by the operation section.

"[T]he fixed point" means the point of the image without changing the position, independent of transformation processing. The fixed point can be positioned, for example, at the center of the images having similar forms.

Strictly speaking, when the image is transferred, the fixed points of the image before/after transferring are not matched. However, "transfer processing" comprises "shrink/erase" processing and "appear/enlarge" processing, and the fixed point is not changed between these two types of processing.

"[T]he specification of the targeted image" is executed by the following process. For example, the targeted image on the screen is enclosed with a stylus pen, or the like, or the region of the targeted image is enlarged according to how long the stylus pen touches the screen, or coordinate values of the region including the targeted image on the screen are designated in advance, and when the pen touches within that region, the image within that region is considered to be specified. According to the second and third processes, it is possible to specify the image and the below-mentioned fixed point at the same time.

The targeted image specification processing section specifies the targeted image according to the foregoing detection. The image processing section executes the instructed transformation processing on the specified targeted image. The fixed-point specification processing section specifies the detected fixed point. Then, the transformation-processed targeted image is displayed on the display means according to the specified fixed point. The display means executes display processing such that the fixed points of the targeted image before/after transformation processing are matched.

An embodiment mode will be given when shrink/erase processing applies to the second aspect of the present invention.

The image processing section thins out pixels forming the image to be erased at every interval of a predetermined number of lines and every interval of a predetermined number of columns and displays the thinned-out image so that the fixed point thereof matches that specified by the fixed-point specification processing section. It repeatedly thins out the pixels until the image shrinks into a predetermined number of pixels. When the thinned-out image shrinks into a predetermined size or smaller, erase processing is executed on the image.

"[A]t every interval of a predetermined number of lines and every interval of a predetermined number of columns" indicates that, for example, the pixels are thinned out at every other line or every other column. The thus-thinned-out image further shrinks by thinning out the pixels "at every interval of a predetermined number of lines and every interval of a predetermined number of columns", for example, at every other line and every other column.

Another embodiment mode will be given when appear/enlarge processing applies to the second aspect of the present invention. First, variously-sized image portions removed by the foregoing thinning-out process are stored in advance. The image processing section 16 reads the non-read smallest image portion among the image portions (including the original image) removed by thinning out pixels forming the targeted image.

The read image portions are sequentially displayed on the screen of the display means in the order of the smaller size of the image portion such that the fixed point specified by the fixed-point specification processing section matches that of the read image portions. The above procedure is repeated until the read image portions are enlarged to reach the original size of the image.

In the third and fourth aspects of the present invention, the following processes are executed. The instruction detecting section detects the instruction for transformation processing of an image given by the operation section and the instruction for specifying the targeted image. The targeted image specification processing section executes specification processing. The instruction detecting section detects the process-execution time when the transformation-processed targeted image should be displayed. Then, the high-speed display instruction section instructs the display means to display the transformation-processed targeted image at high speed.

In the fifth and sixth aspects of the present invention, the following processes are executed. The instruction for transformation processing of the image is given by the I/O-integrated operation section and is detected by the instruction detecting section. The instruction for specifying the targeted image is detected by the instruction detecting section. Likewise, the instruction for specifying the fixed point set by the I/O-integrated operation section is detected, and the instruction for specifying the level variable set by the I/O-integrated operation section is detected.

Then, the targeted image which will be the object of transformation processing is specified by the targeted image specification processing section. It is transformation-processed by the image processing section according to the level variable. Then, the display means displays the targeted image with the fixed point according to the specified level variable.

"[T]he level variable" indicates various levels, for example, the transformation speed, the density of display, the color of display, and the like.

"[T]he I/O-integrated operation section" comprises a stylus pen and a tablet arranged on the screen of the display means, the tablet receiving an instruction from the stylus pen and outputting a corresponding signal. "[T]he I/O-integrated operation section" can be varied by changing the number of electromagnetic lines, the capacitance, or the pressure, individually or a combination thereof by the operation of a user.

The objects, features, and advantages of the present invention will become more apparent from the following detailed description with reference to the drawings.

DESCRIPTION OF THE PREFERRED EMBODIMENTS

An embodiment of the present invention will now be described.

Figure 1:
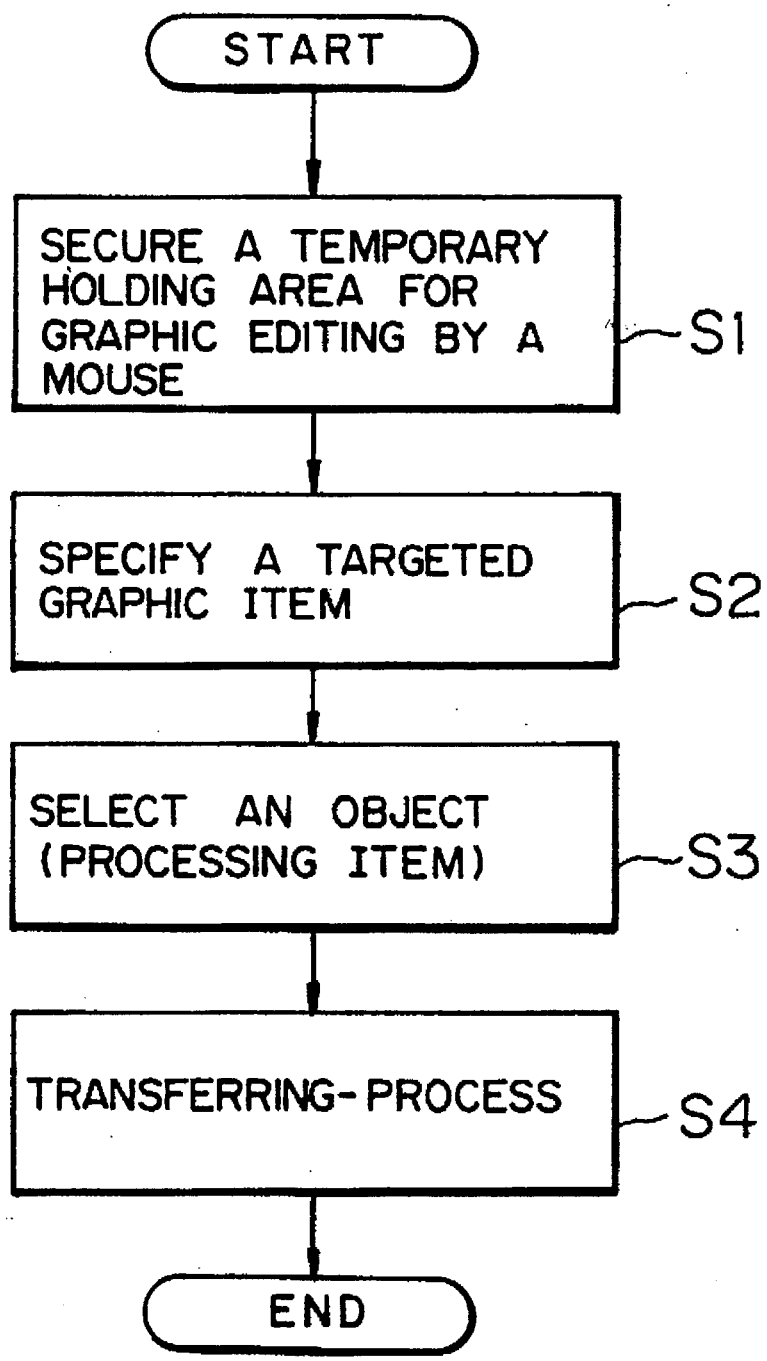
FIG. 1 is a flow chart according to a conventional example.
Figure 2:
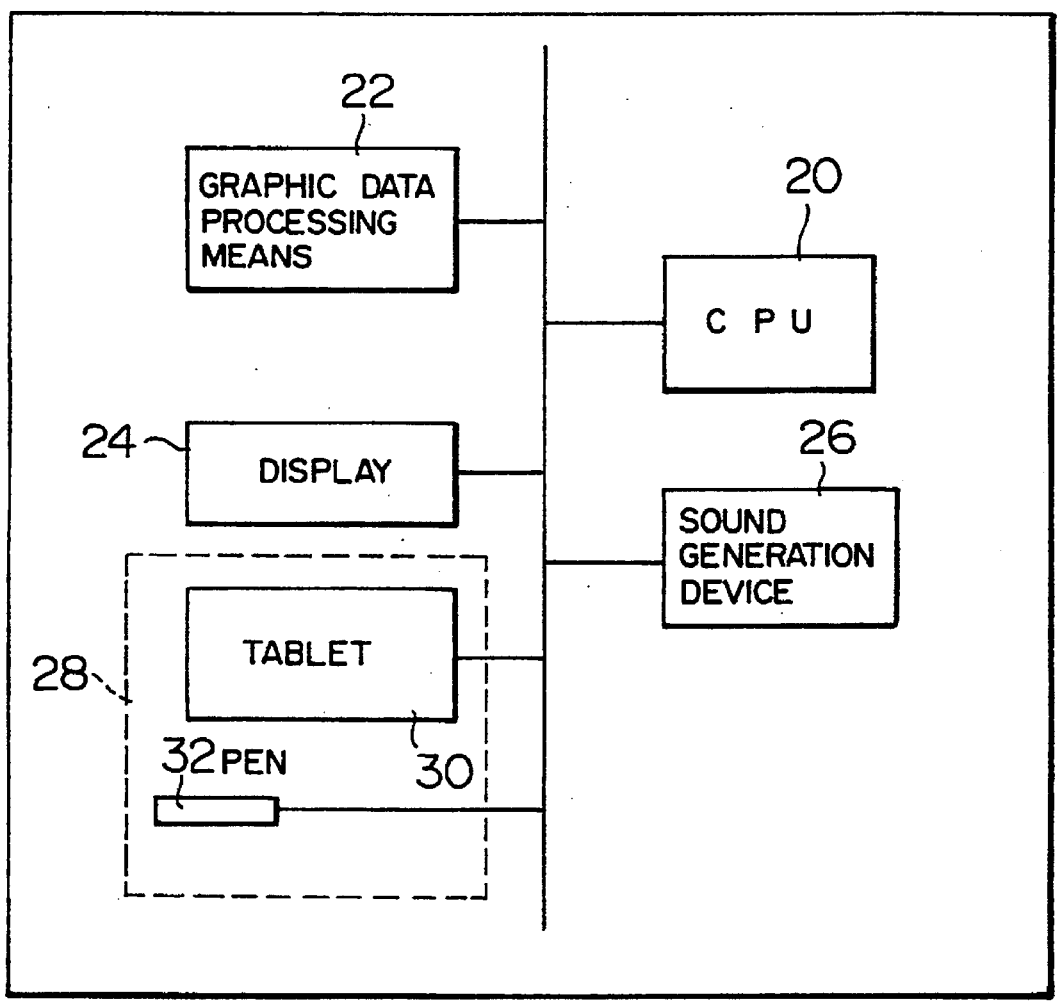
FIG. 2 is a block diagram showing the construction of a unit according to an embodiment.

FIG. 2 shows the overall construction of a terminal, that is, a graphics processing unit, according to the present embodiment.

As illustrated in FIG. 2, the graphics processing unit of the present embodiment includes a CPU 20 executing various controls on the terminal; graphic data processing means 22, equivalent to an image processing section, executing various processes regarding, for example, graphics in the form of an image; a display 24 for displaying graphics and the like; a sound generation device 26 for generating sound instructed by a user; and an I/O-integrated operation section 28.

A user gives an instruction to execute, for example, a graphics transformation process, through the I/O-integrated operation section 28 integrally comprising a tablet 30 arranged on the screen of the display 24 used as an output unit and a stylus pen 32 used as an input unit.

Figure 3:
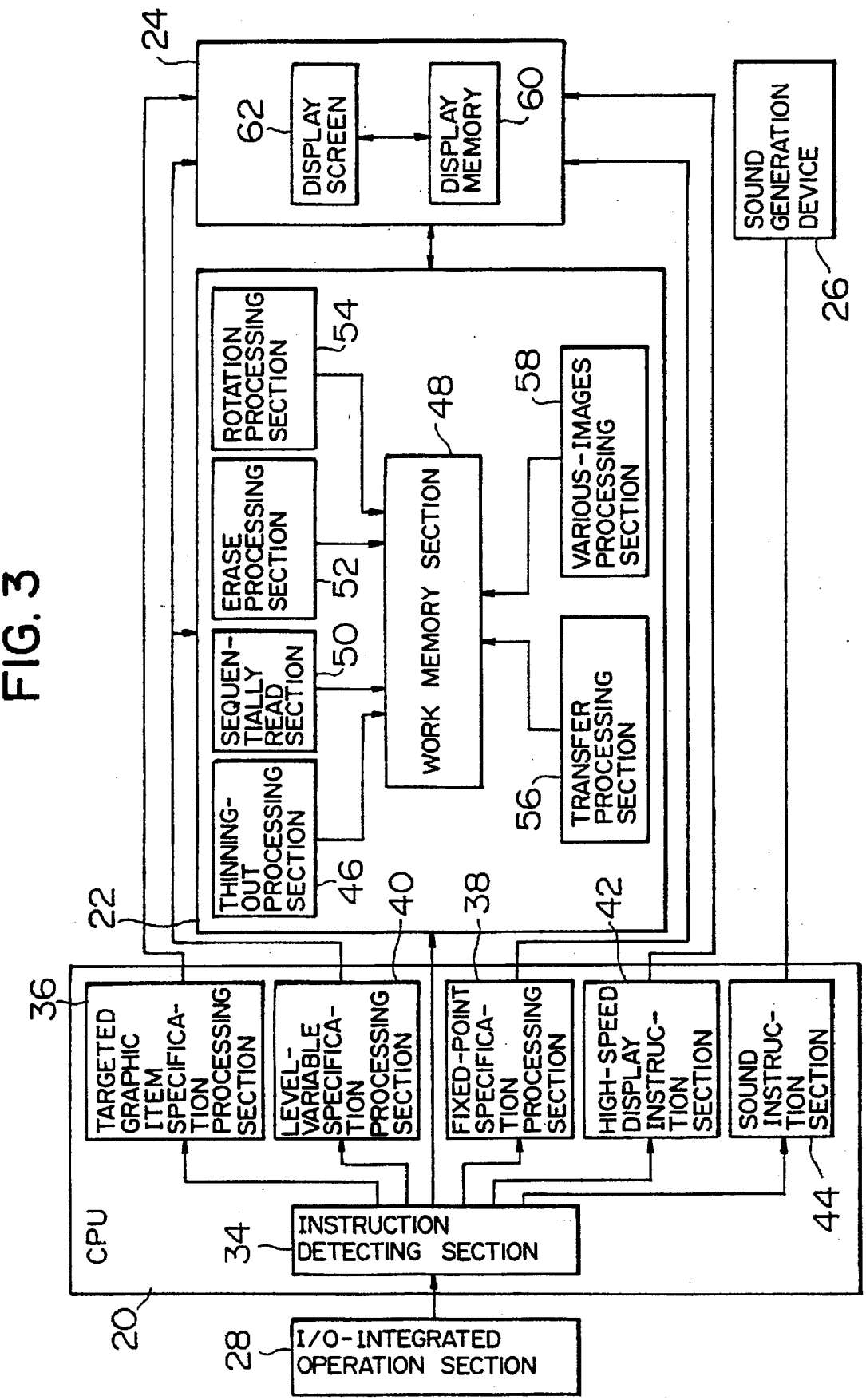
FIG. 3 is a block diagram showing the embodiment.

Further, FIG. 3 indicates the functions of the CPU 20, the graphic data processing means 22 and the display 24 in detail.

As can be seen from FIG. 3, the CPU 20 includes the following sections. An instruction detecting section 34 detects an operational instruction for a transformation process for executing transformation of the size and the configuration, and the like, of the graphic item by the operation section 28; or for a process of specifying the targeted image, which will be the object of the transformation process; or for a process of specifying the fixed point. When the instruction for the transformation process is detected by the instruction detecting section 34, and the instruction for specifying the targeted graphic item, which will be the object of transformation processing, is also detected, a targeted graphic item specification processing section 36 sends the targeted graphic item to the graphic data processing means 22. When the instruction for the transformation process is detected by the instruction detecting section 34, and the instruction for specifying the fixed point which is immovable independent of the transformation process is also detected, a fixed point specification processing section 38 instructs a display 24 to display the specification of the fixed point. A level variable specification processing section 40 processes the specification so as to display or execute transformation processing of the graphic item according to the level variable indicating the speed of the transformation, the density of display, the color of display, or the like, which is detected by the instruction detecting section 34. When the instruction for the transformation processing is detected by the instruction detecting section 34, and the process executing time when the display of the transformation processed-graphic item, and the like, should be executed is also detected, a high-speed display instruction section 42 instructs the display 24 to execute a high-speed display of the transformation processed-targeted graphic item. When the instruction for the transformation processing is detected by the instruction detecting section 34, when the graphic item processed by the graphic data processing means 22 is displayed on the screen of the display 24, a sound instruction section 44 instructs the generation of a certain sound in synchronism with the display.

The graphic data processing means 22 executes transformation processing for the targeted graphic item specified by the targeted graphic item specification processing section 36, and when the level variable is instructed to be specified, the graphic data processing means 22 executes transformation processing according to the specified level variable. The graphic data processing means 22 comprises the following sections. A thinning-out processing section 46 executes a thinning-out process. A read section 50 sequentially reads the graphic portions removed by the previous thinning-out process and stored in a work memory section 48 beforehand in the order of smaller-sized graphic portions. An erasing section 52 executes erasing of a displayed graphic item. A rotation processing section 54 executes rotation processing of a graphic item. A transfer processing section 56 executes transferring of a graphic form. A various-images processing section 58 processes various images. The work memory section 48 temporarily holds the targeted image which will be the object of image processing, and also holds the images removed by the thinning-out process.

The display 24 further includes a display memory 60 storing images, such as a graphic item which will be displayed, and a display screen 62.

The operation of a first embodiment will now be explained.

Figure 4:
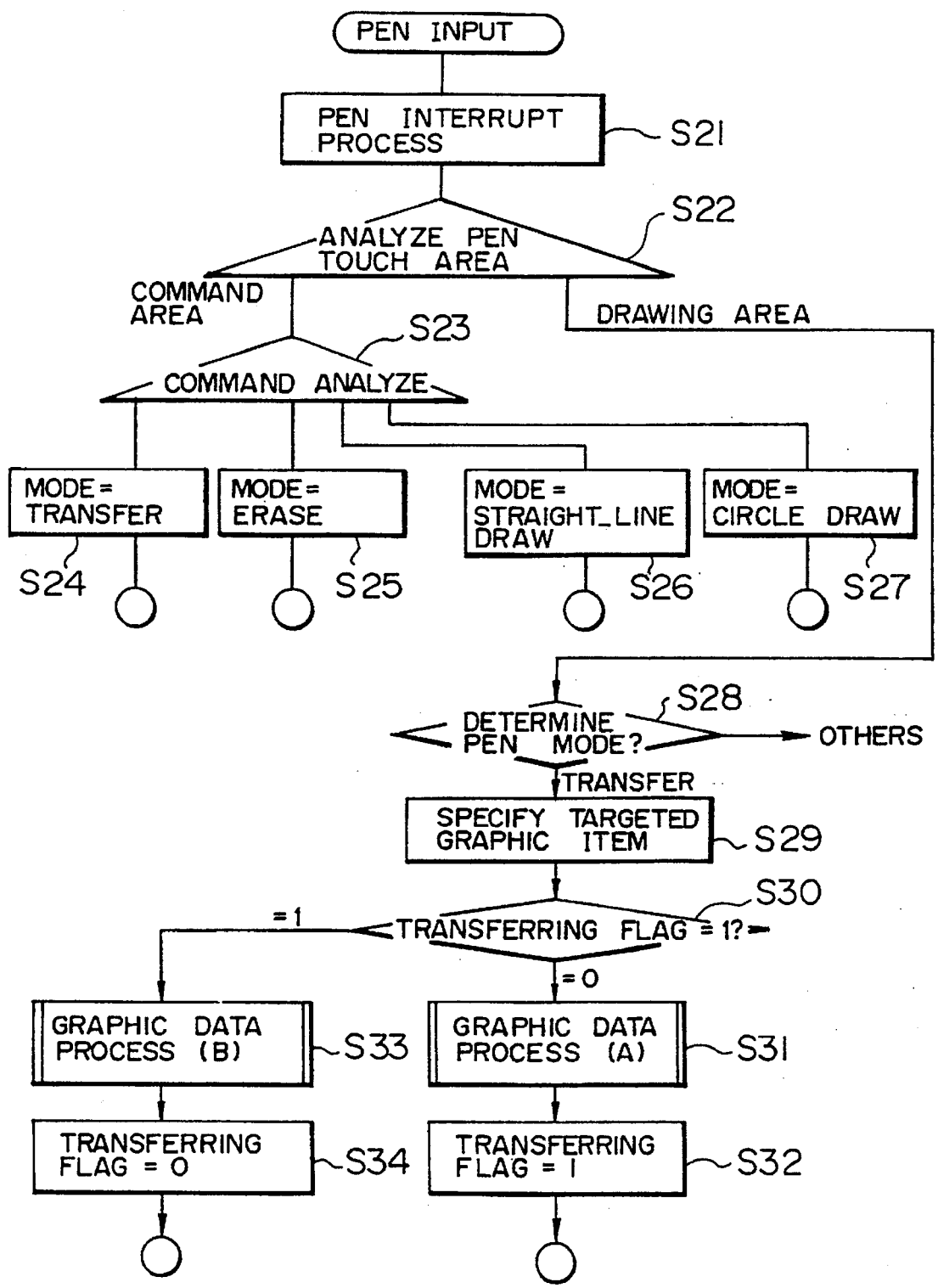
FIG. 4 is a flow chart according to the embodiment.

As shown in FIG. 4, in the step S21, interrupt processing is instructed to the hand-writing terminal including the integrated tablet 30 with the stylus pen 32 of the I/O-integrated operation section 28. Then, in the step S22, the instruction detecting section 34 determines the area where the pen 32 touches on the tablet 30 of the screen. If the pen 32 touches the command area, the operation proceeds to the step S23 in which command analysis is executed.

As a result of this analysis, if a transfer mode is selected as the command mode, the operation proceeds to the step S24 in which an instruction is given to the transfer processing section 56 of the graphic data processing means 22.

The transfer processing section 56 executes a transfer process of a graphic item by executing a thinning-out process, an erase process and a read process on that graphic item.

The instruction for transfer processing is given as follows. For example, when a graphic item is transferred from point P to point Q on the screen of the display shown in FIG. 2, the hand-writing terminal including the display-integrated tablet 30 draws a graphic item with the pen 32 and specifies the command mode. When an operator transfers the displayed graphic item from P to Q, he/she first selects the pen mode as the transfer mode by this command.

Or, when the erase mode is selected as the command mode, the operation proceeds to the step S25 in which the erase section 52 of the graphic data processing means 22 is driven. Likewise, when the straight-line drawing mode is selected as the command mode, or when the circle drawing mode is selected as the command mode, the function corresponding to each case is started.

Subsequently, when the position of the pen 32 touches within the drawing area in the step S22, the operation proceeds to the step S28 in which the type of pen mode is determined. As a result, if the pen mode is determined as the transfer mode, the operation proceeds to the step S29 in which the relevant targeted graphic item is specified with the stylus pen 32 of the I/O-integrated operation section 28. The graphic item to be transferred, that is, the targeted graphic item, is specified by, for example, enclosing it with a quadrilateral with the stylus pen 32. When the instruction for specifying the targeted graphic item is detected by the instruction detecting section 34, specification processing of the targeted graphic item is executed by the targeted graphic item specification processing section 36.

Further, when the instruction for the transfer processing is detected by the instruction detecting section 34, the operation proceeds to the step S30 in which the transfer processing section 56 of the graphic data processing means 22 determines whether the transferring flag is "0" or "1".

If the transferring flag is "0", the operation proceeds to the step S41 in which graphic data processing (A) is executed.

Graphic data processing (A) is employed whereby when transfer processing is executed, the targeted graphic item to be transferred is gradually shrunk so as finally to be erased from the screen. Such shrink-erase processing is executed so that the targeted graphic item to be transferred is sucked into the tip of the pen so as to eventually be erased. It is operated according to a flow chart shown in FIG. 5.

Figure 5:
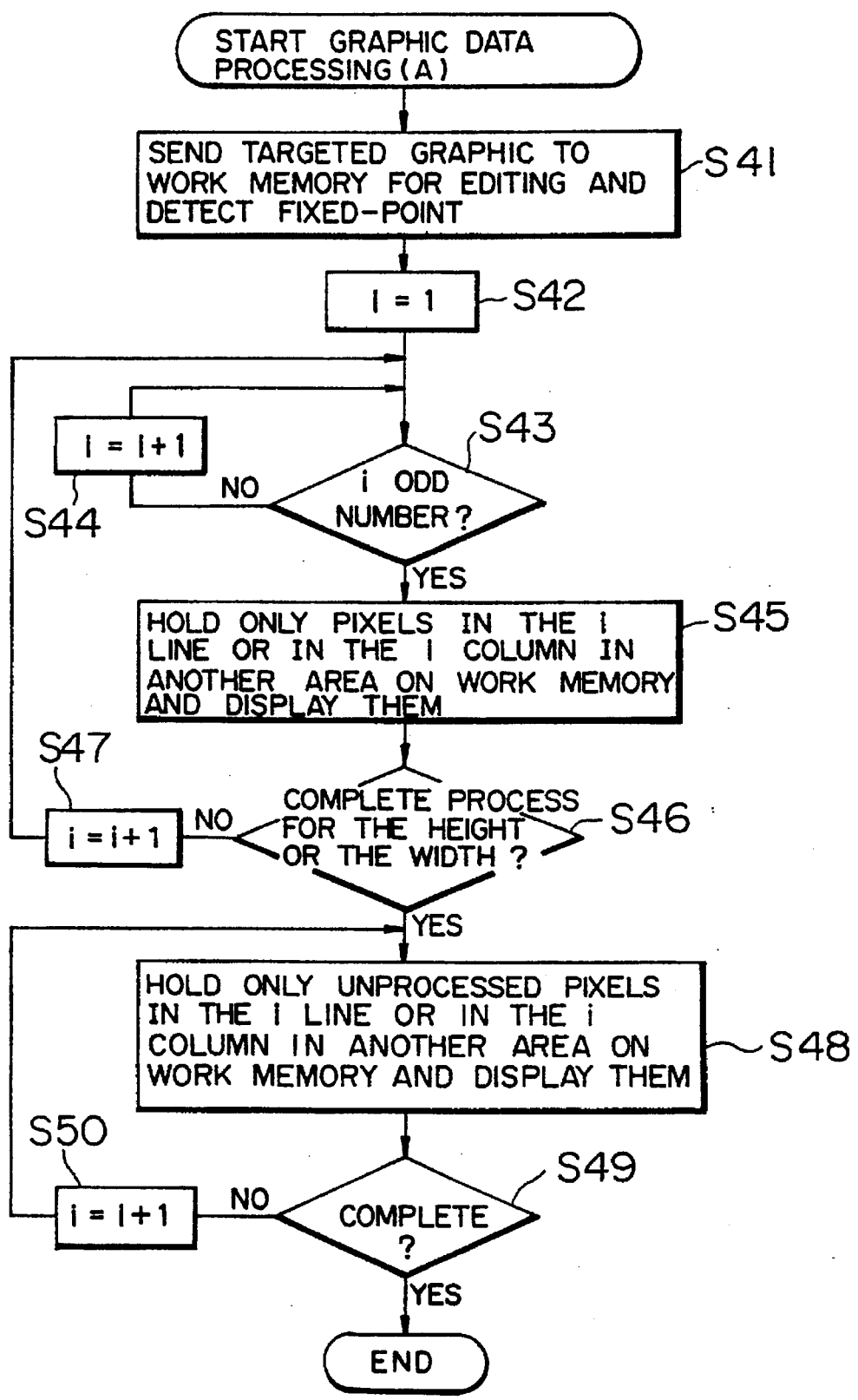
FIG. 5 is a flow chart showing graphic data processing (A) according to a first example.

As shown in FIG. 5, the targeted graphic item specified and processed by the targeted graphic item specification processing section 36 is written into the work memory section 48 of the graphic item processing means 22. The size of the targeted graphic item is determined as a width (column numbers) having W dots and as a height (line numbers) having H dots.

The stylus pen 32 touches the position $P(X_1, Y_1)$ on the tablet 30 on or in the vicinity of the targeted graphic item, thereby instructing the specification of the fixed point. Thus, the position $P(X_1, Y_1)$ is recognized as the fixed point.

Then, the operation proceeds to the step S42 in which i=1. If i is an odd number in the step S43 (including when i=1), the operation proceeds to the step S45 in which, among the pixels having a width of W dots and a height of H dots, only the dots in the i line and in the odd columns and the dots in the i column and in the odd lines are written into the work memory section 48 and the data is sent to the display memory 60 of the display 24.

If i is an even number in the step S43, the pixels in the i line and in the odd columns, and the pixels in the i column and in the odd lines are not processed without going into the step S45. Thus, only when i is an odd number, the following process, that is, the thinning-out process, is continually executed.

The thinning-out processed image is sent to the display memory 60 of the display 24. It is displayed so that the fixed points P of the graphic item before/after thinning-out processing are matched to each other.

In the step S46, the operation is continued until the process for either of the height (column) or the width (line) is completed.

When it is completed, the operation proceeds to the step S48 in which only the odd-numbered dots of the unprocessed i column (or i line) are sent to the work memory section 48 and the even-numbered dots remain. Likewise, the above thinning-out process is repeated in the step S50 until the targeted graphic item is shrunk into a final single dot, thereby executing the shrinking process on the targeted graphic item. When only the final single dot remains, the erase processing section 52 executes the erasing of the graphic item. As stated above, the targeted graphic item to be transferred is shrunk to the center of the position P which is touched by the pen 32 so as to eventually be erased, thereby giving a user the illusion that the targeted graphic item is sucked into the pen 32 placed on the position P.

The graphic portions removed by the respective thinning-out stages and obtained in the above erase processing are stored in the work memory section 48 and will be used in the following graphic data processing (B).

Figure 6:
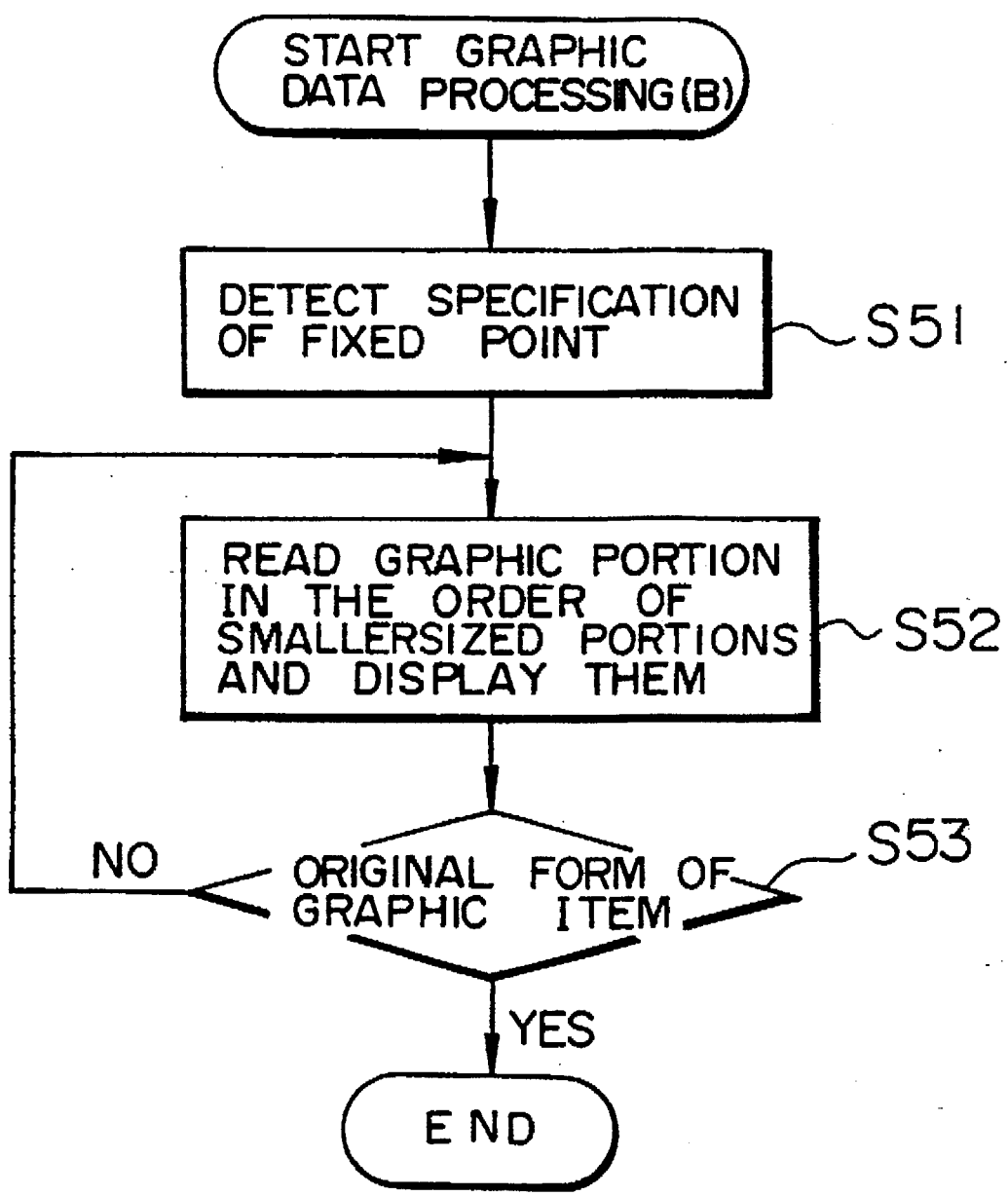
FIG. 6 is a flow chart showing graphic data processing (B) according to the first example.

The graphic data processing (B) is shown in FIG. 6.

As illustrated in FIG. 6, the stylus pen 32 contacts the tablet 30 in the step S51, and whereby the instruction detecting section 34 detects that the instruction for appearance processing is given and detects the touched position Q ($X_2$, $Y_2$). Then, an instruction is given to the transfer processing section 56 of the graphic item processing means 22 and the fixed point specification processing section 38 detects the position Q ($X_2$, $Y_2$) as the fixed point and instructs the display 24 to display the position Q as the fixed point.

In the step S52, the transfer processing section 52 instructs the read section 50 to read the smallest graphic portion among the non-read graphic portions removed by the thinning-out process and stored in the work memory section 48 during the execution of graphic data processing (A) so that the position Q ($X_2$, $Y_2$) is displayed as the fixed point.

That is, the pre-displayed graphic item is erased before the newly-read graphic item is displayed, and the newly-read graphic item is displayed without changing the fixed point Q.

The foregoing process gives an operator the illusion that the targeted graphic item is enlarged at the place where it is transferred as if it were exploding from the tip of the pen 32, thus assuming the form of the original graphic item.

As described above, the graphic portions removed by the thinning-out process are repeatedly displayed until they return to the original size, thus completing the transfer process.

According to the erasing process of transfer processing, the targeted graphic item looks like it shrinks toward the tip of the stylus pen 32 and is erased when the pen 32 is detached from the operational surface. Thus, an operator is given the illusion that the targeted graphic item is sucked into the pen 32. Likewise, according to the appearance process of transfer processing, when the pen 32 contacts the place where the graphic item is to be transferred, such contact point is determined as the fixed point, thereby giving an operator to the illusion that the targeted graphic item is exploding from the tip of the pen.

Figure 7:
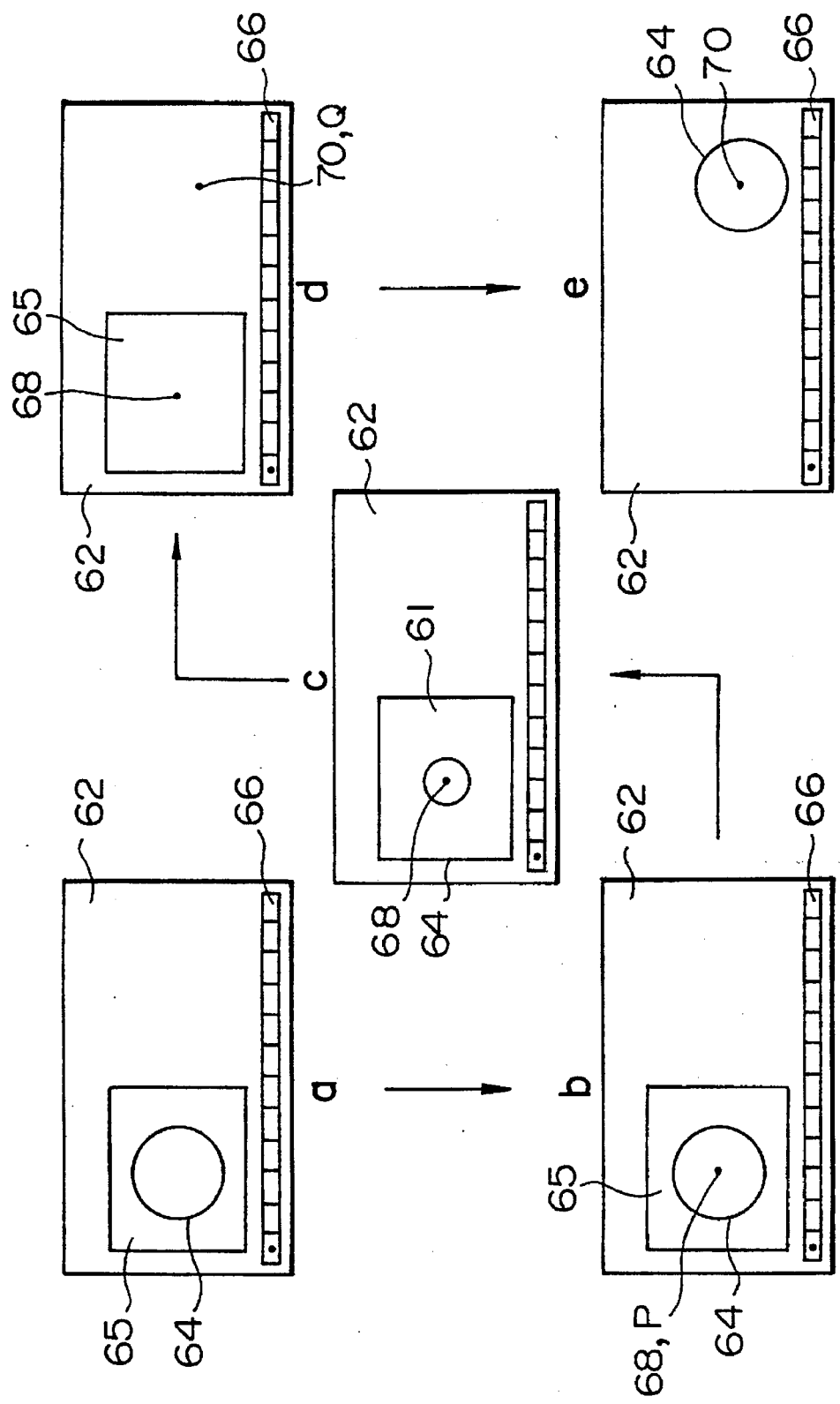
FIG. 7 shows an example of a screen display according to the first embodiment.

FIG. 7 shows an example when a circle 64 is transferred to the display screen 62 of the display 24 when the first embodiment is realized.

Based upon an analysis of a pen touch area 66, FIG. 7(a) shows that the pen touches the transfer mode of the command area, and also indicates that the circle 64 is enclosed with a quadrilateral 65 with a pen 32 in order to specify the circle 64 as the object to be transformed (the object of the shrink-erase processing in this example).

FIG. 7(b) shows a fixed point 68 (P) of the targeted circle 64 to be transformation-processed being touched with a pen 42.

FIG. 7(c) shows the circle 64 being gradually shrunk so as to eventually be erased by transformation processing.

FIG. 7(d) shows a fixed point 70 (Q) in the place where the circle 64 is to be transferred being touched with the pen. The fixed point will be the point fixed when appear-enlarge processing is executed.

FIG. 7(e) shows the circle 64 appearing from the fixed point 70 (Q) so as to eventually return to its original size.

A second embodiment will now be described.

In this embodiment, when the transfer processing comprising erasing/appearing processes is executed on an image, such as a graphic item, graphic portions removed by the thinning-out process are sequentially displayed while rotating them. According to such a process in this embodiment, the graphic item looks like as if it shrunk into the tip of the pen while being rotated, and as if it exploded from the tip of the pen while being rotated to be enlarged again, thereby giving a user a three-dimensional sensation when a graphic item is transferred.

A third embodiment will be also explained.

In this embodiment, when a thinning-out process and an appearance process are executed on an image, that is, a graphic item, a sound is generated in synchronism with the display of the graphic item. For example, when the graphic item is sucked into the tip of the pen, some kind of sucking sound is generated. On the other hand, when the graphic item explodes from the tip of the pen, some kind of exploding sound is generated. Thus, the sensation of sucking into and exploding out of the tip of the pen is further enhanced.

A description will now be given of a fourth embodiment.

In this embodiment, an instruction for touching, or the like, is given to the tablet 30 with the stylus pen 32, thereby inputting the process execution time, and thus instructing the high-speed display instruction section 52 to display or erase the transforming-processed targeted graphic item at high speed when the process is executed. Hence, a sensation is given to a user that a process of, for example, transferring a graphic item, can be executed at high speed.

Further, a fifth embodiment will be described.

Figure 8:
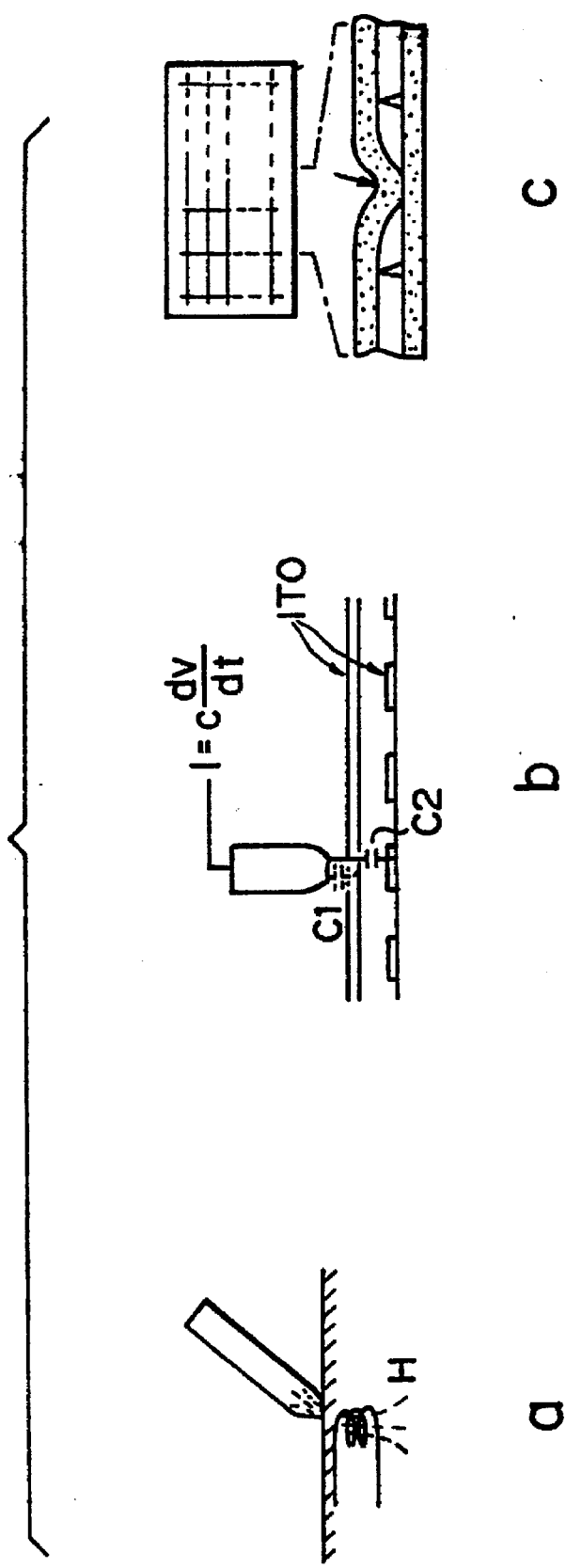
FIG. 8 shows examples of various stylus pens and tablets.

In this embodiment, the functions of the stylus pen 32 of the I/O-integrated operation section 28 are fully utilized. The stylus pen 32 is operated so as to vary the distance between the tablet 30 and the pen 32 when the I/O-integrated operation section 28 is an electromagnetic induction type shown in FIG. 8(a), or when it is a capacitance type shown in FIG. 8(b). The stylus pen 32 is also operated so as to vary the pressure between the tablet 30 and the pen 32 when the I/O-integrated operation section 28 is a pressure type shown in FIG. 8(c). Thus, an instruction for providing variously-levelled variables is given. As a result, not only a two-dimensional sensation representing the plane position but also a three-dimensional sensation is further given to a user so as to give a more realistic appearance, thus further giving an operator the sensation of easier handling of the operation.

Such level variables are applied to, for instance, the first–fourth embodiments. For example, the speed of the graphic item sucking into and exploding out of the tip of the pen can be varied, thereby further enhancing the three-dimensional sensation.

As a result, a user can have the sensation of, for example, transfer-processing of a graphic item, at high speed.

A description will be further given of a sixth embodiment.

In this embodiment, "the specification of the targeted image (graphic item, or the like)" may be executed by designating the area of the image itself on the screen or the regions, such as the narrowest region enclosing the image, not by enclosing the targeted image on the screen with the stylus pen 32, unlike the first–fifth embodiments. When the pen touch is detected within a region, the image within that region may be determined as being specified, thus executing transformation-processing of the image.

In this embodiment, since the fixed point and the targeted image can be specified with the same pen touch, the operation is simplified and easy to handle, and processing can be executed at high speed.

Also, in this embodiment, according to how long the stylus pen 32 touches, the region of the targeted graphic item can be specified on the basis of the stylus pen 32. For example, when the touching time is short, transform-processing may be executed on only the graphic items close to the stylus pen 32. When the touching time is long, the graphic items distant from the stylus pen 32 as well as those close thereto may be transform-processed. Since the image and the fixed point can also be specified by the same operation in this case, the operation can be simplified and easy to handle, and the processing can be executed at high speed.

As will be clearly understood from the foregoing description of the respective embodiments, the present invention offers the following advantages.

According to the respective embodiments, means for shrinking and enlarging graphic items are first prepared. A graphic item is shrunk toward the pen tip by employing the means for shrinking the graphic item, and is erased when the pen 32 is detached from the operational surface. Unlike the operation of a mouse, such a process stems from the characteristics of the three-dimensional orientation inherent in the pen 32. Consequently, it gives an operator the illusion that the targeted image (targeted graphic item) is sucked into the pen 32. When the pen 32 is placed on the operational surface at the position where the targeted graphic item is to be transferred, the graphic item is enlarged by employing the means for enlarging it. The above process gives an operator the illusion that the graphic item explodes out of the tip of the pen.

In a device having high operation speed, advantages obtained by erasing/displaying a graphic item at the instant the pen touches, similar to those obtained by the above enlarging/shrinking the graphic item, can be expected.

In the description of the respective embodiments according to the present invention, the coordinates specified with the pen 32 and the coordinates of the fixed point are perfectly matched to each other. However, it is not necessary to match the two sets of coordinates to each other as long as such a modification does not impair the sensation of the graphic item being sucked into/exploded out of the tip of the pen by shrink/erase processing and appear/enlarge processing, respectively.

According to the foregoing embodiments, an improvement in the human/machine interface when the pen touches can be achieved.

What is claimed is:

1. A graphics processing unit comprising:
    display means for displaying an image on a screen;
    an operation section executing an operation including an instruction to said display means for a display process and an instruction for specifying a fixed point without changing a position thereof, independent of transformation processing;
    an instruction detecting section detecting an instruction given by said operation section for transformation processing of said image, and for specifying a targeted image which will be an object of said transformation processing;
    a targeted image specification processing section; when said instruction detecting section detects the instruction for said transformation processing and the instruction for specifying said targeted image, said targeted image specification processing section executing a process including sending said targeted image to an image processing section;
    a fixed-point specification processing section; when said instruction detecting section detects the instruction for said transformation processing and an instruction for specifying a fixed point without changing a position thereof, independent of said transformation processing, said fixed-point specification processing section instructing said display means to display said targeted image such that fixed points of said targeted image before and after said transformation processing are matched to each other; and
    an image processing section executing said instructed transformation processing on said specified targeted image;
    wherein a targeted graphic item to be processed is shrunk and erased so as to appear to be sucked into a tip of a stylus pen, and wherein the targeted graphic item to be processed is enlarged so as to appear to be exploded from the tip of the stylus pen.

2. A method of graphics processing, comprising the steps of:
    detecting an instruction for transformation processing of an image;
    detecting an instruction for specifying a targeted image which will be an object of said transformation processing and detecting an instruction for specifying a fixed point without changing a position thereof, independent of said transformation processing of said targeted image; and
    executing said transformation processing on said detected targeted image and displaying said targeted image on a display means such that fixed points of said targeted image before and after said transformation processing are matched to each other;
    further comprising the steps of:
    detecting an instruction for shrink and erase processing of an image;
    detecting an instruction for specifying a targeted image which will be an object of said erase processing and detecting an instruction for specifying a fixed point without changing a position thereof, independent of said erase processing of said image;
    creating an image formed of pixels as a result of thinning out pixels forming said targeted image at one of every interval of a predetermined line number and every interval of a predetermined column number, to form a thinned-out image;
    displaying the thinned-out image on said display means such that said fixed points of said image before and after it is thinned out are matched to each other; and
    erasing said image after repeatedly thinning out said image until it shrinks into a predetermined number of pixels;
    wherein a targeted graphic item to be processed is shrunk and erased so as to appear to be sucked into a tip of a stylus pen.

3. A method of graphics processing, comprising the steps of:
    detecting an instruction for transformation processing of an image;
    detecting an instruction for specifying a targeted image which will be an object of said transformation processing and detecting an instruction for specifying a fixed point without changing a position thereof, independent of said transformation processing of said targeted image; and
    executing said transformation processing on said detected targeted image and displaying said targeted image on a display means such that fixed points of said targeted image before and after said transformation processing are matched to each other;

further comprising the steps of:

detecting an instruction for appear and enlarge processing of an image;

detecting a targeted image which will be the object to appear and enlarge and detecting a fixed point without changing a position thereof, independent of said appear and enlarge processing;

reading a smallest non-read image portion among a pre-created plurality of image portions formed of pixels as a result of thinning out pixels forming said targeted image at one of every interval of a predetermined line number and every interval of a predetermined column number;

displaying said image on said display means such that said fixed point of a newly-read image and that of a pre-read displayed image are matched to each other; and repeating the display of said image portions in the order of smaller-sized portions until they return to an original size.

4. A method of graphics processing, comprising the steps of:

detecting an instruction for transformation processing of an image;

detecting an instruction for specifying a targeted image which will be an object of said transformation processing and detecting an instruction for specifying a fixed point without changing a position thereof, independent of said transformation processing of said targeted image; and executing said transformation processing on said detected targeted image and displaying said targeted image on a display means such that fixed points of said targeted image before and after said transformation processing are matched to each other;

wherein during transformation processing of said image, further comprising the step of displaying said image subjected to said transformation processing on said display means while it rotates at a center about said specified fixed point at a predetermined angle; wherein a targeted graphic item to be processed is shrunk and erased so as to appear to be sucked into a tip of a stylus pen, and wherein the targeted graphic item to be processed is enlarged so as to appear to be exploded from the tip of the stylus pen.

5. A graphics processing unit comprising:

display means for displaying an image on a screen;

an operation section executing an operation, including giving an instruction to the screen for a display process;

an instruction detecting section detecting said instruction given by said operation section for transformation processing of said image, or for specifying a target image which will be an object of said transformation processing, or for a process of specifying a fixed point;

a target image specification processing section sending said target image to an image processing section when said instruction detecting section detects the instruction for said transformation processing and the instruction for specifying said target image;

an image processing section executing said instructed transformation processing on said specified target image; and a high-speed display instruction section; when said instruction detecting section detects said instruction for said transformation processing and detects a process executing time when said transformation-processed image should be displayed, said high-speed display instruction section instructing said display means to display said transformation-processed target image at high speed;

wherein a targeted graphic item to be processed is shrunk and erased so as to appear to be sucked into a tip of a stylus pen, and wherein the targeted graphic item to be processed is enlarged so as to appear to be exploded from the tip of the stylus pen.

6. A method of graphics processing comprising the steps of:

detecting an instruction for transformation processing of an image;

detecting an instruction for specifying a targeted image which will be the object of said transformation processing;

detecting a process-executing time when said transformation-processed image should be displayed; and displaying said targeted image at high speed after said targeted image is transformation-processed;

wherein a targeted graphic item to be processed is shrunk and erased so as to appear to be sucked into a tip of a stylus pen, and wherein the targeted graphic item to be processed is enlarged so as to appear to be exploded from the tip of the stylus pen.

7. A graphics processing unit comprising:

display means for displaying an image on a screen;

an I/O-integrated operation section giving an instruction to the screen for a display process by using a tablet arranged on the screen and a stylus pen and an instruction for specifying a fixed point without changing a position thereof, independent of said transformation processing;

an instruction detecting section detecting operational instructions given by said operation section for transformation processing of said image, and for specifying a targeted image which will be the object of said transformation processing;

a targeted image specification processing section sending said targeted image to an image processing section when said instruction detecting section detects an instruction for said transformation processing and an instruction for specifying said targeted image;

a fixed-point specification processing section; when said instruction detecting section detects the instruction for said transformation processing and an instruction for specifying a fixed point without changing a position thereof, independent of said transformation processing, said fixed-point specification processing section instructing said display means to display said targeted image such that said fixed point of said targeted image before and after said transformation processing are matched to each other;

an image processing section executing said instructed transformation processing on said specified targeted image; and a level variable specification processing section; when said instruction detecting section detects a level variable indicating a region to be transformed, a transformation speed, a density of display, or a color of display, said level variable specification processing section processing said level variable to said display means and said image processing section such that said image is displayed or transformation-processed according to the detected level variable:

wherein a targeted graphic item to be processed is shrunk and erased so as to appear to be sucked into a tip of a stylus pen, and wherein the targeted graphic item to be processed is enlarged so as to appear to be exploded from the tip of the stylus pen.

8. A method of graphics processing comprising the steps of:

detecting an instruction for transformation processing of an image given by an I/O-integrated operation section;

detecting an instruction for specifying a targeted image which will be an object of said transformation processing and which is set by said I/O-integrated operation section, and detecting an instruction for specifying a fixed point without changing a position thereof, independent of said transformation processing, and detecting a level variable indicating a region to be transformed, a transformation speed, a density of display, or a color of display, set by said I/O-integrated operation section; and executing said transformation processing on said targeted image according to the detected level variable, and subsequently, matching said fixed point of said targeted image before and after said transformation processing and displaying said targeted image having said level variable:

wherein a targeted graphic item to be processed is shrunk and erased so as to appear to be sucked into a tip of a stylus pen, and wherein the targeted graphic item to be processed is enlarged so as to appear to be exploded from the tip of the stylus pen.

9. A graphics processing unit according to any one of claims 1 and 6, when a sound instruction given by said operation section is detected by said instruction detecting section, further comprising a sound generating instruction section instructing generation of a predetermined sound in synchronism with display of said image when said image processed by said image processing section is displayed on said display means; and a sound generating unit for generating sound when an instruction is given by said sound generating instruction section.

* * * * *